US006938089B1

(12) United States Patent
Slaby et al.

(10) Patent No.: US 6,938,089 B1
(45) Date of Patent: Aug. 30, 2005

(54) APPARATUS AND METHOD FOR CONTROLLING ACCESS TO A SERVICE OVER A COMMUNICATIONS SYSTEM

(75) Inventors: John Slaby, Windsor (GB); Thomas Loughlin, Balbriggan (IE); Henry Brankin, Delgany (IE)

(73) Assignee: Virtual Access Technology Limited, Dublin (IE)

( * ) Notice: Subject to any disclaimer, the term of this patent is extended or adjusted under 35 U.S.C. 154(b) by 0 days.

(21) Appl. No.: 09/550,324

(22) Filed: Apr. 14, 2000

Related U.S. Application Data

(63) Continuation of application No. PCT/GB97/02850, filed on Oct. 16, 1997.

(51) Int. Cl.[7] ...................... G06F 15/16; G06F 15/177; G06F 15/173; G06F 11/30
(52) U.S. Cl. ...................... 709/229; 709/203; 709/220; 709/221; 709/222; 709/226; 713/1; 713/2; 713/100; 713/202
(58) Field of Search ............................... 709/203, 208, 709/218, 220–228, 230, 238, 219, 229; 713/1, 713/2, 100, 200–202

(56) References Cited

U.S. PATENT DOCUMENTS

| 4,361,851 | A | | 11/1982 | Asip et al. ...................... 358/84 |
|---|---|---|---|---|
| 4,996,685 | A | * | 2/1991 | Farese et al. ................. 370/352 |
| 5,544,303 | A | * | 8/1996 | Maroteaux et al. .......... 345/733 |
| 5,557,748 | A | | 9/1996 | Norris ...................... 395/200.1 |
| 5,594,717 | A | * | 1/1997 | Watanabe et al. ............ 370/232 |
| 5,608,720 | A | * | 3/1997 | Biegel et al. ................. 370/249 |
| 5,610,910 | A | * | 3/1997 | Focsaneanu et al. ......... 370/351 |
| 5,631,954 | A | * | 5/1997 | Evans et al. ................. 370/271 |
| 5,659,685 | A | * | 8/1997 | Williams et al. ............. 709/220 |
| 5,724,509 | A | * | 3/1998 | Starkweather et al. ....... 709/220 |
| 5,727,051 | A | * | 3/1998 | Holender ................ 379/112.05 |
| 5,754,765 | A | * | 5/1998 | Danneels et al. ............ 709/222 |
| 5,778,323 | A | * | 7/1998 | Dorenbosch et al. ........ 455/561 |
| 5,809,282 | A | * | 9/1998 | Cooper et al. ............... 709/226 |
| 5,826,000 | A | | 10/1998 | Hamilton ................ 395/182.02 |
| 5,835,727 | A | * | 11/1998 | Wong et al. ................. 709/238 |

(Continued)

FOREIGN PATENT DOCUMENTS

EP          0791881 A1      8/1997       ........... G06F 9/445

(Continued)

OTHER PUBLICATIONS

Hassanein, H.S., et al. "Performance of alternative media for LAN interconnection." Global Data Networking, 1993. Proceedings, Dec. 12-15, 1993; Page(s): 217-224.*

(Continued)

*Primary Examiner*—Melvin H. Pollack
(74) *Attorney, Agent, or Firm*—Schwegman, Lundberg, Woessner & Kluth, P.A.

(57) ABSTRACT

Apparatus for accessing a service over a communications network comprises an interface for connection to a communication line of the network, a memory for storing a unique serial number and configuration data, and a process of configuring the interface to communicate with a remote configuration system when the apparatus is first connected to the communication line and then to transmit the unique serial number. Configuration data is received from the remote configuration system and stored in the memory. The apparatus is then re-initialized to use the configuration data for future communications to access a service over the network.

44 Claims, 6 Drawing Sheets

U.S. PATENT DOCUMENTS

| | | | | |
|---|---|---|---|---|
| 5,838,907 A | * | 11/1998 | Hansen | 709/220 |
| 5,841,972 A | * | 11/1998 | Fanshier | 709/220 |
| 5,852,722 A | | 12/1998 | Hamilton | 395/200.51 |
| 5,875,037 A | * | 2/1999 | Murata et al. | 358/400 |
| 5,898,780 A | * | 4/1999 | Liu et al. | 713/155 |
| 5,951,649 A | * | 9/1999 | Dobbins et al. | 709/238 |
| 5,974,322 A | * | 10/1999 | Carlsson et al. | 455/446 |
| 5,974,547 A | * | 10/1999 | Klimenko | 713/2 |
| 5,991,292 A | * | 11/1999 | Focsaneanu et al. | 370/352 |
| 6,018,449 A | * | 1/2000 | Nelson et al. | 361/66 |
| 6,038,251 A | * | 3/2000 | Chen | 375/222 |
| 6,066,182 A | * | 5/2000 | Wilde et al. | 717/175 |
| 6,073,172 A | * | 6/2000 | Frailong et al. | 709/222 |
| 6,118,768 A | * | 9/2000 | Bhatia et al. | 370/254 |
| 6,151,619 A | * | 11/2000 | Riddle | 709/204 |
| 6,181,679 B1 | * | 1/2001 | Ashton et al. | 370/244 |
| 6,219,708 B1 | * | 4/2001 | Martenson | 709/226 |
| 6,230,194 B1 | * | 5/2001 | Frailong et al. | 709/220 |
| 6,317,826 B1 | * | 11/2001 | McCall et al. | 713/1 |
| 6,335,927 B1 | * | 1/2002 | Elliott et al. | 370/352 |

FOREIGN PATENT DOCUMENTS

| | | | | |
|---|---|---|---|---|
| EP | 0793170 A1 | 9/1997 | | G06F 9/445 |
| GB | 2295299 | 5/1996 | | H04L 12/28 |

OTHER PUBLICATIONS

Lilin Liu et al. "Performance analysis of the gateway interconnecting LANs with ISDN." Southeastcon '96. 'Bringing Together Education, Science and Technology'., Proceedings of the IEEE. Apr. 11-14, 1996; Page(s): 409-412.*

Lobjinski, M. et al. "Realization of broadband data services in ATM-networks." Digital Communications, 1990. 'Electronic Circuits and Systems for Communications'. Proceedings., 1990 International Zurich Seminar on , Mar. 5-8, 1990; P 73-86.*

Search Report for App. No. 01125197.2, (Jun. 23, 2003), 5 pages.

Cunha, C., et al., "Characteristics of WWW Client-based Traces," (Jul. 18, 1995), pp. 1-18.

Gareiss, R., "Casting the Web over ATM," (Jun. 1997), 2 pages.

Heywood, P., "Added Insight into Carrier Networks," (Apr. 1997), 2 pages.

Thomas, R., "Inoperable RMON? Plug and Pray," (May 1995), 6 pages.

* cited by examiner

APPARATUS AND METHOD FOR CONTROLLING ACCESS TO A SERVICE OVER A COMMUNICATIONS SYSTEM

This application is a continuation of International Patent Application No. PCT/GB97/02850, filed on Oct. 16, 1997, all of which are incorporated herein by reference.

The present invention generally relates to a method and apparatus for controlling access to a service over a communication system.

With the ever-increasing use of networks of computers there is an increasing need to simplify the setting up of a network and to more efficiently monitor the operation of the network.

One method by which computers can be networked over large distances is by using the telecommunications network. The prime example of this is the internet. The interconnections into the internet can either be via conventional analogue lines, via the integrated services digital network (ISDN) or via a permanent connection such as a leased line. An alternative network comprises the frame relay network that allows for high data transfers and requires a permanent connection.

A problem with interfacing to a communications network in order to access a service is that the interface apparatus must be configured for communication. Conventionally this is carried out manually requiring a user to either follow a series of steps, and/or to have some knowledge of networking.

When a service is provided over a network, the service provider will collect and process statistics on events surrounding the usage of the service by each user. This requires the service provider to gather and process a large amount of data and if a user wishes to obtain any of the statistics related to access to the service by the user, the user must request this information from the service provider whereupon the service provider can transmit the information to the user.

It is an object of one aspect of the present invention to overcome the problem of configuring apparatus for accessing a service by providing an apparatus which can automatically configure itself and can be automatically and remotely configured.

Thus in accordance with the first aspect the present invention is concerned with communication apparatus for interfacing to a communication network in order to access a service wherein unique identification information which is stored in a memory is transmitted over the network to a remote configuration system the first time the apparatus is connected to the network. The remote configuration system determines appropriate configuration data which is transmitted back to the apparatus and stored for future use. The configuration data will be used by the apparatus in order to configure the apparatus for accessing the service. The remote configuration system automatically determines subsequent configuration data which it transmits to the communication apparatus. This is stored for future use by the communication apparatus.

Thus this aspect of the present invention removes the need for a user to have any knowledge of networking or to have to undergo any steps in configuring the apparatus to access a service. At the time of purchase, the user will subscribe to a service whereupon a third party responsible for configuring the apparatus remotely is given information on the user, the unique identifying information for the apparatus, and possibly the level and/or type of service required by the user. The third party can comprise the service provider or any third party delegated by a service provider to provide the configuration service. Using the information on the level and/or type of service required for the user, and the unique identifying information, configuration data can thus be generated at a remote configuration system ready to be downloaded to the apparatus when it is first connected. The apparatus will be pre-configured with data which instructs the apparatus to automatically connect to the remote configuration system when it is first connected in order to obtain the configuration data. In a telecommunications network for example the initially set configuration data can cause the apparatus to dial a telephone number which connects automatically to the remote configuration system. In a fixed network the configuration data could simply instruct the apparatus to make a connection to a particular address in the network.

The apparatus can be incorporated within a computer system to control the communications between the computer system and the service. Alternatively, the apparatus can comprise an interface between a computer system and a communications network. The computer system can comprise a single computer or a network of computers for example networked by a local area network.

The interconnection between the apparatus and the service can be made via any form of network. In one embodiment a communication connection made to the apparatus comprises at least one ISDN line. In such an arrangement a D channel can be used for permanent connection between the apparatus and the network whilst the B channels can be used as necessary for communications. In this way the D channel can allow for permanent monitoring of the apparatus by a remote system such as the service provider or some form of management system. The subsequent configuration data can be sent using the D channel at any time without the user having to make a connection using the B channels.

It is an object of another aspect of the present invention to reduce the processing of communication information by the service provider and to reduce the flow of communication control data over the network.

In accordance with this aspect, the present invention is concerned with apparatus for communicating with a remote system over a network to access a service wherein information on the usage made of the service by the computer system is gathered, processed, locally stored, and then transmitted to a remote management system.

In one embodiment the remote management system comprises the service provider and thus by locally processing the information and only transmitting the processed information, not only is the processing requirements of the service provider reduced, but also the amount of information which must be transmitted is reduced. Further, since the processed information is locally stored, it is readily accessible by users of the apparatus.

The information which can be gathered can comprise for example the number of bytes transmitted and received, the number of frames transmitted and/or received, the number of errors, and the number of calls made over a telecommunications line.

In one embodiment the apparatus includes a clock such that the information can be gathered with respect to time and the processing can be carried out periodically to generate summary information which summarises the information on the communications made.

To allow a user local access to the processed information, a user interface is provided which can take any convenient form such as a serial interface, or more conveniently the apparatus can operate a computer program to provide the user interface which can comprise a Graphical User Interface (GUI) such as a web page. In such an arrangement a machine independent program e.g. a Java applet can be run in order to obtain the processed information and arrange it for output to the user in a graphical user interface form such as a web page.

Configuration of data initially set in the apparatus, or configuration data obtained remotely in accordance with the first aspect of the present invention can determine the processing carried out on the gathered information.

Embodiments of the present invention will now be described with reference to the accompanying drawings in which.

Figure 1:
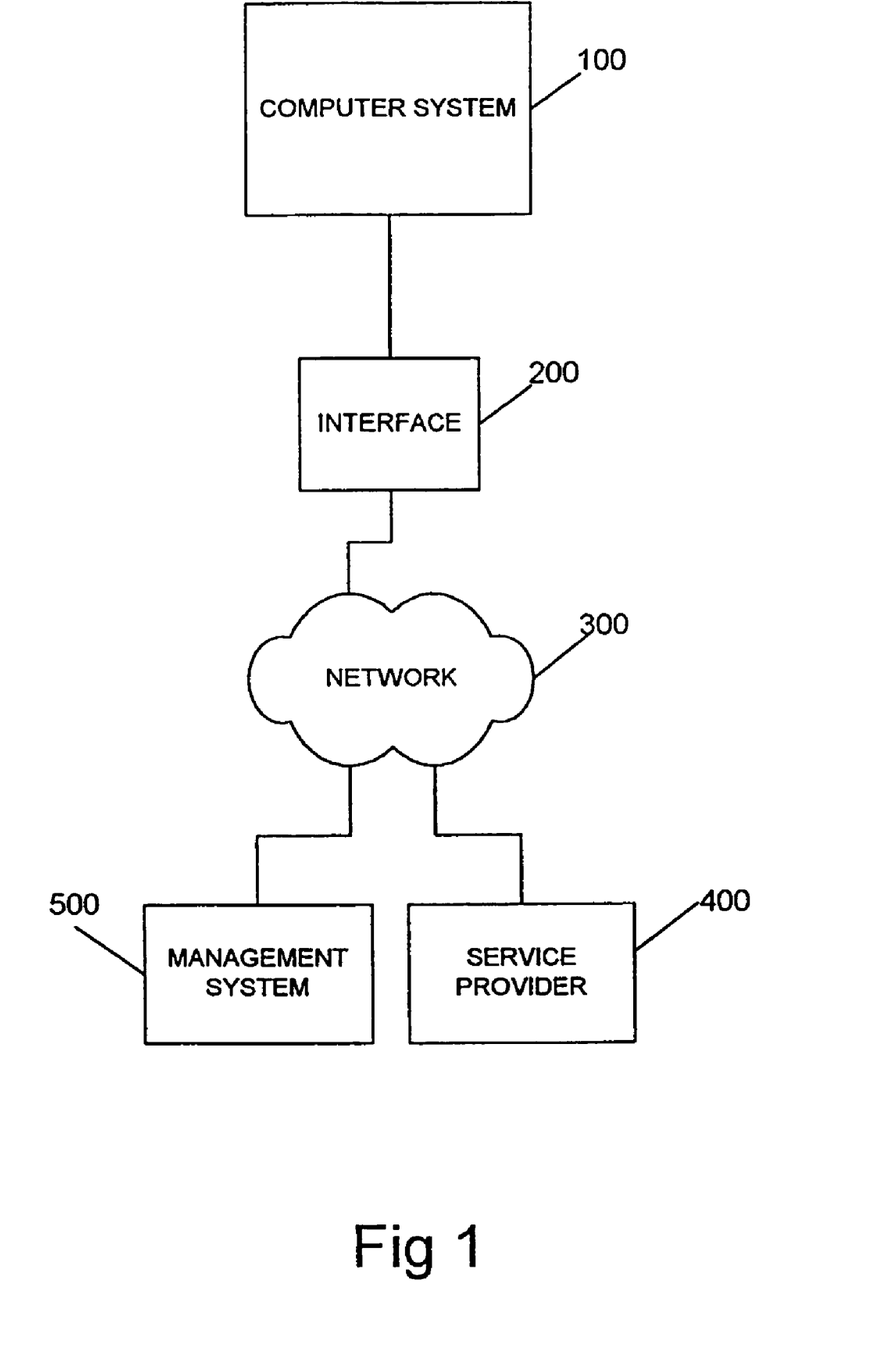
FIG. 1 is a schematic drawing of a generalised system in accordance with an embodiment of the present invention.

Referring now to FIG. 1, this diagram illustrates a generalised system in accordance with an embodiment of the present invention wherein a computer system 100 is connected via an interface 200 to a network 300 in order to access a service 400. A management system 500 is provided connected to the network 300 in order to control access to the service and to provide configuration data for the interface 200 as required.

Although the computer system 100 and interface 200 are shown in FIG. 1 separately, the interface 200 can be combined within the computer system 100.

Figure 2:
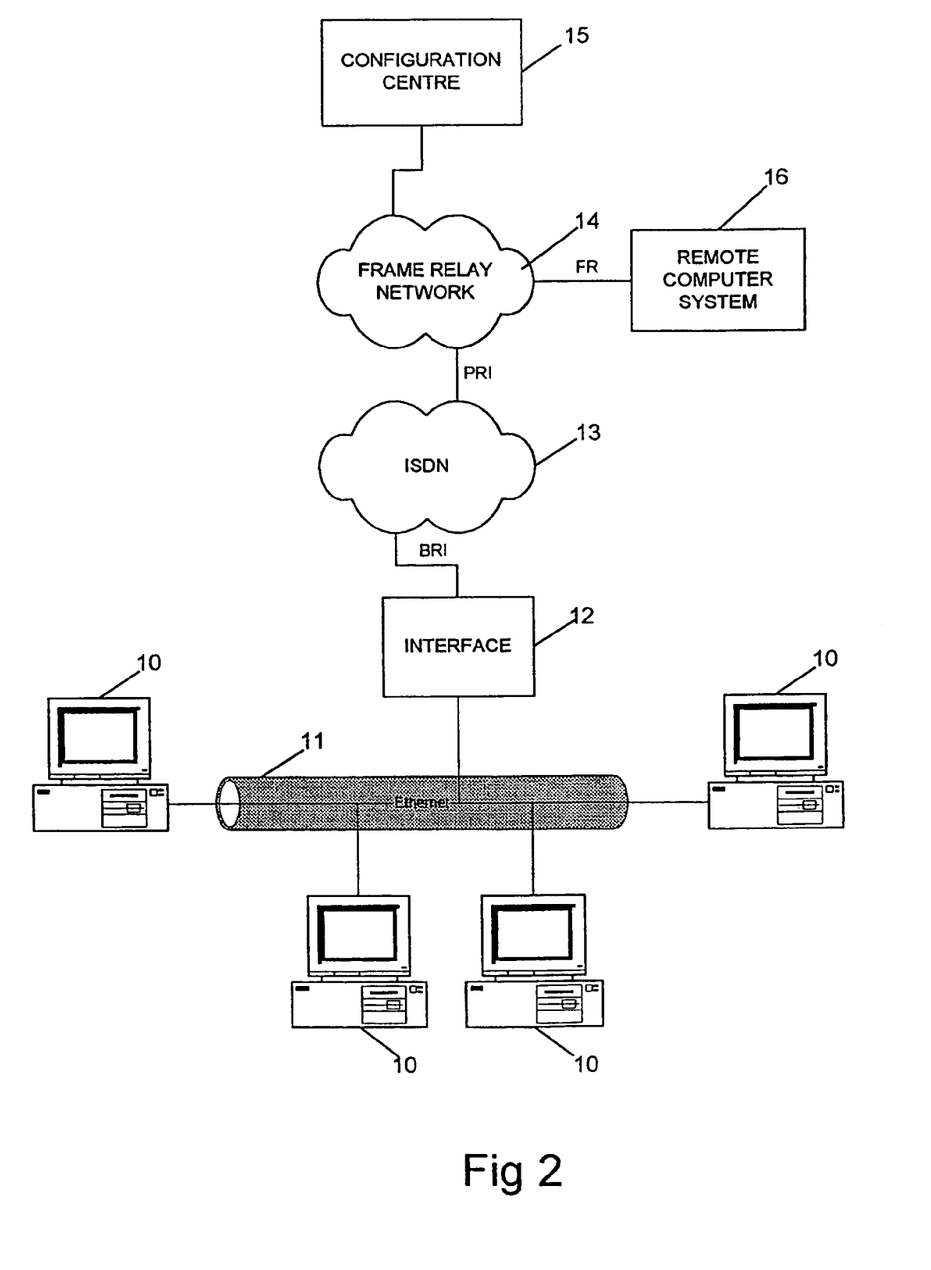
FIG. 2 is a schematic drawing of an arrangement using the frame relay network in accordance with an embodiment of the present invention.

FIG. 2 illustrates schematically a more specific embodiment of the present invention which utilises the frame relay network. In this embodiment computers 10 are networked over a local area network (LAN) (11) which is provided with an interface 12 which is connected to an ISDN network 13 via a basic rate ISDN (BRI) line. The ISDN network 13 is connected to the frame relay network via a primary rate ISDN (PRI) line. A remote computer system 16 is connected to the frame relay network 14 using the frame relay (FR) line and a configuration centre 15 is provided also connected to the frame relay network 14 for providing configuration data to the interface 12.

In this embodiment when the interface 12 is initially installed it is configured to dial into the frame relay network 14 via the ISDN network 13 in order to obtain configuration data from the configuration centre 15. The automatic configuration capability in this arrangement removes the necessity for the user of interface 12 to have any knowledge or understanding of the network to which the interface 12 is being connected. The interface 12 is initially configured (factory set) to connect to the configuration centre 15 which will have been provided with information on the service required by the user of the interface 12 and the unique serial number of the interface 12 e.g. at the point of purchase. In this way once the interface 12 has connected to the configuration centre 15, it will transmit its unique serial number whereupon the configuration centre 15 will determine e.g. look up the required configuration data for transmission back to the interface 12. Once the interface 12 has received the new configuration data, this can be used for all future communications in order to connect to the remote computer system 16. The re-configuring of the interface 12 can take place by a re-initialisation of the interface 12, by a reloading of the controlling software and configuration data, or simply by re-reading the configuration data.

Figure 3:
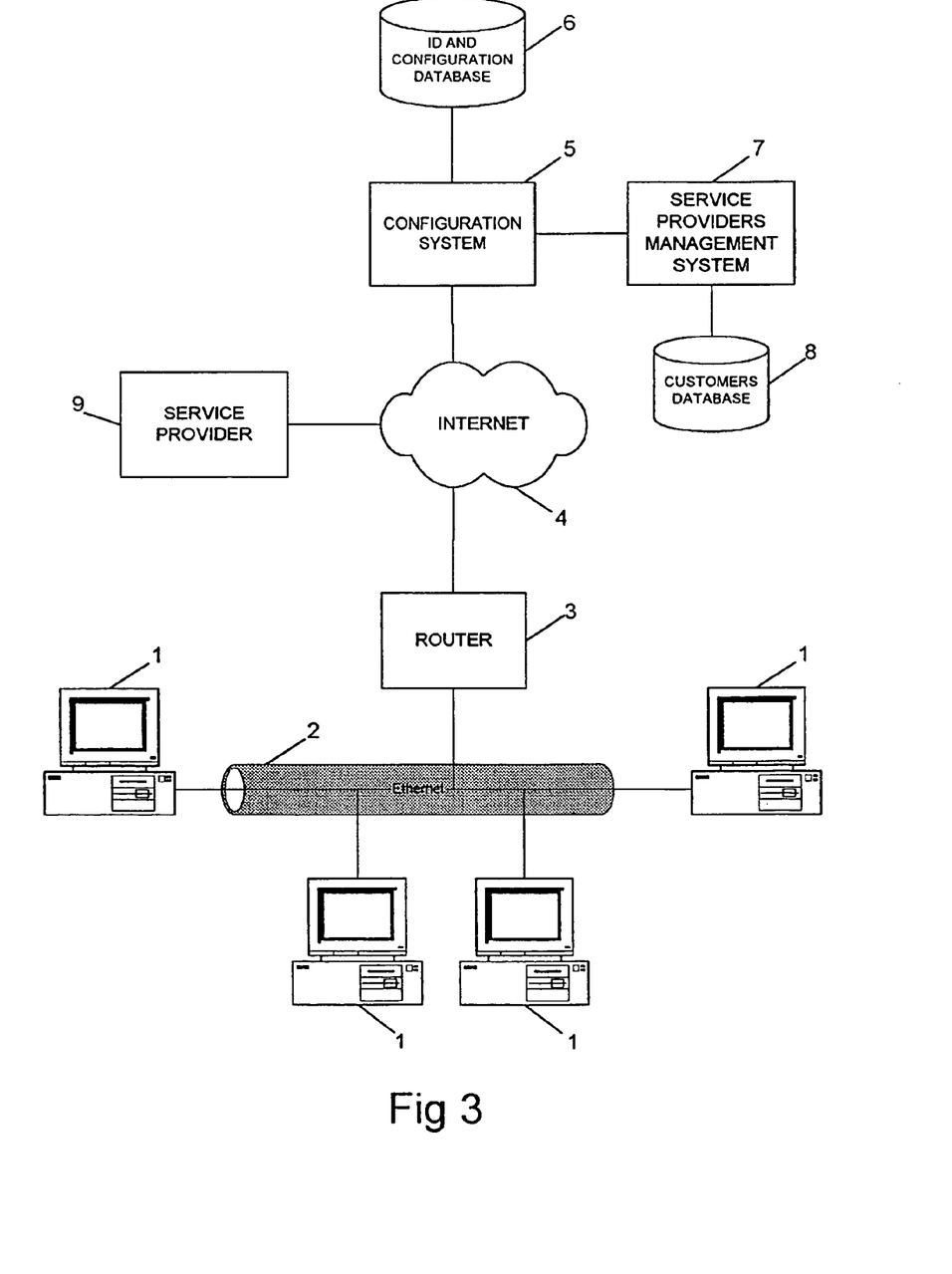
FIG. 3 is a schematic drawing of an arrangement using the internet in accordance with an embodiment of the present invention.

FIG. 3 illustrates an alternative embodiment of the present invention wherein computers 1 are connected over a local area network which in this embodiment comprises an ethernet 2. A router 3 is connected to the ethernet 2 to interface the ethernet 2 to the internet 4. A service provider 9 is connected to the router 3 via the internet 4 and a configuration system 5 is also connected to the internet 4 and accessible to the router 3. The configuration system 5 is provided with a database 6 of configuration data for each router serial number. Also FIG. 3 illustrates the presence of a service provider's management system 7 and a customer's database 8.

Figure 6:
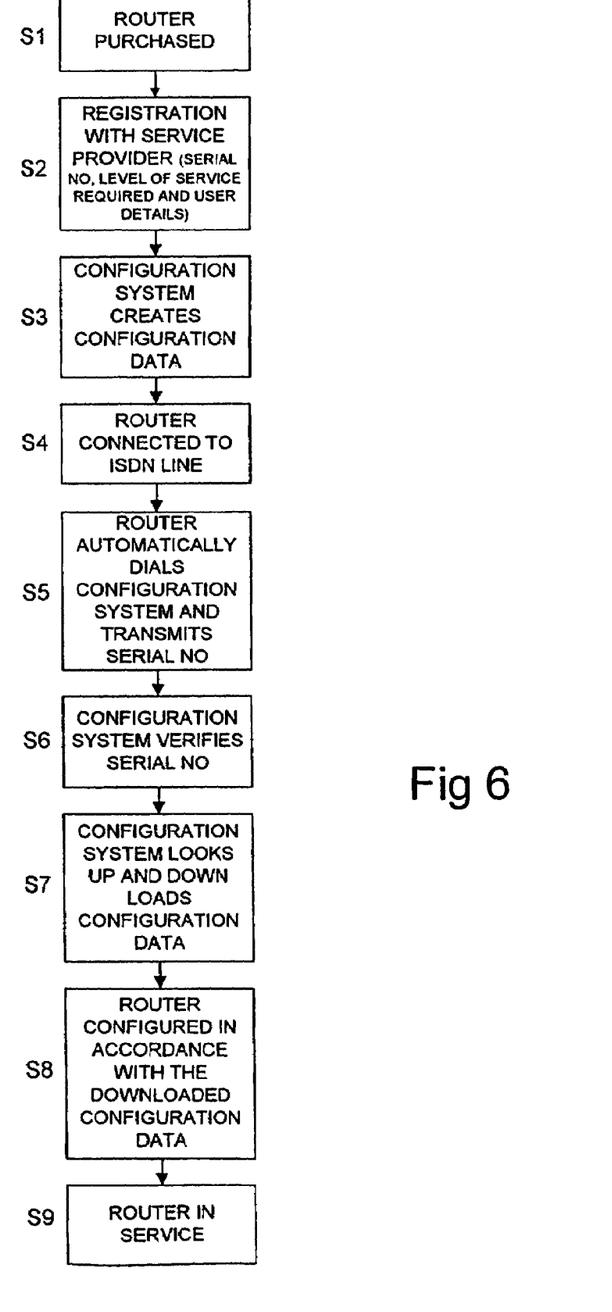
FIG. 6 is a flow diagram illustrating the steps involved in configuring the apparatus in accordance with an embodiment of the present invention.

The operation of this system will now be described with reference to the flow diagram of FIG. 6. When the router 3 is purchased or soon thereafter and before first connection to access the service, the user registers with the service provider. The registration takes the form of providing the service provider with the serial number of the router, details of the user, and possibly information which identifies the level or type of service required from the provider. Of course, where the provider only provides one level of service i.e. a simple connection, there is no need for this information since it is assumed that if the user is registering connection is required. Such information provided to the service provider is typically held in a customer database 8. The service provider's management system 7 will contain the customer details not just for the purposes of configuration, but also for general management purposes such as billing. The information can then be passed from the service provider's management system 7 into the configuration system 5 which can comprise a separate computer. Alternatively, the functions of the configuration system 5 and the service provider's management system 7 could be combined. With the information on the level and/or type of service required and the serial number of the router, the configuration system can then determine suitable configuration data and install this in the database 6. Of course, as new routers are purchased for use in accessing the service, this process of determining suitable configuration data will be repeated to build up the database 6.

When the router is connected to the internet via for example an ISDN line, the router automatically dials the configuration system and when the connection is made it transmits its unique serial number. The serial number can be encoded for security purposes before being transmitted. When the configuration system receives the serial number, if it is encoded it is decoded and it then goes through a verification process to determine whether it is a valid serial number. If validation is successful the configuration system refers to the database 6 to look up the appropriate configuration data which is then transmitted to the router 3 for storage in the local memory. The transmitted configuration data can be suitably encoded before transmission for security purposes. The connection by the router to the configuration system 5 can then be terminated and the router can then configure itself in accordance with the newly downloaded configuration data. This can be achieved by a re-initialisation of the router, a reloading of the control software and configuration data, or simply by re-reading the configuration data. Once this has been carried out, the router is now configured for future access to the service provided by the service provider 9 i.e. the configuration data has set up the router to dial the correct telephone number to be connected to the service provider, it has loaded a user name and password into the router for transmission to the service provider, and it has set up other connection parameters required for communication between the router and the service provider.

Since in FIG. 3 the router 3 comprises a LAN access router, users of the computers 1 looking to access the services of the service provider 9 will be able to do so seamlessly via the router 3. None of the users of the computers or the network manager of the local network need carry out any steps in configuring the LAN access router initially. Also, it is possible for the configuration system 5 to amend or update the configuration data in the router 3 remotely without the need for the local users or local network manager to do anything. One reason for updating the configuration data may be that the connection parameters have changed e.g. the telephone number for the service provider is changed or the data rate. In such circumstances the configuration system 5 may automatically download new configuration data to the router 3 for subsequent use. Alternatively, where a service provider 3 provides different levels of service or possibly even a different service provider is required by the user of the router 3, the user will have contacted the service provider requesting a new or updated level of service. This will of course result in new or updated configuration data in the database 6 which will be automatically downloaded to the router 3. It may also be possible for the user of the router 3 i.e. the local network management to make an online request for updated configuration data.

In this embodiment the connection between the network 4 and the router 3 can be via any form of convenient communication line e.g. a conventional analogue line, an ISDN line, or a permanent communication line. If the communication line is analogue, of course the router will include a modem. Where an ISDN line is available, this will provide a high data rate without the cost of a permanent line. Also, since an ISDN line includes a data (D) channel which can be permanently open for communications of data, the configuration system 5 can use the D channel for downloading configuration data to the router 3.

The configuration system 5 can comprise a workstation running a configuration setup application. The database 6 can be provided within the workstation using any suitable database software such as Microsoft's SQL database software. In order to provide a convenient interface to the user the server can run Microsoft's Internet Infoserver to provide a web interface. The workstation will also operate as a file transfer protocol (FTP) server for the transfer of the configuration data to the router 3.

Although in FIG. 3 the configuration system 5 is illustrated as being directly connected to the internet 4, the workstation may be connected to a LAN which has a router connected thereto. Any method of connecting the configuration system 5 to the internet can be used which allows for the router 3 to connect directly into it to obtain configuration data. Thus, although the configuration system 5 is most likely to be operated by the service provider, it need not be and can be operated by a third party.

In the configuration system, in order to form the configuration data there are three levels of configurations to be considered and these are (1) configuration parameters for the hardware of the router, (2) configuration parameters specific to the provider's service and (3) parameters specific to the requirements of the user. In the specific embodiment the Microsoft Internet Information server acts as interface between the operator of the system and the Microsoft SQL database to allow for the parameters to be entered into the database to form the configuration data.

Although FIG. 3 illustrates that the router 3 has only one communication line to the internet, it may have a number of communication lines for simultaneous communication to a number of service providers and possibly to a number of configuration systems. Thus, the router 3 will be capable of storing within its memory a configuration file for each communication line which communicates to a service provider. Further, the router may not be limited to a single service provider and thus more than one set of configuration data may be provided (or a set of configuration data with options for different service providers) can be stored within its memory and the router may enable a user to select the service provider to be accessed.

Although FIG. 3 illustrates the router as interfacing a local area network to the internet, the router 3 may in fact comprise a simple interface between a single computer system and the internet.

In a conventional network arrangement when a service provider provides a service over the internet to a user, it gathers statistics (i.e. information on events caused by access made by the user) and processes this raw statistical data into more useful summary data. This conventional method of gathering statistical information requires the service provider to continuously retrieve data from the user which stores the raw gathered statistics locally. If a user required summary information it was necessary previously to request this information from the service provider who would then download it to the user. One embodiment of the present invention overcomes the limitations of the prior art by providing for local processing of the gathered statistics so that this information can be made available locally and can be periodically uploaded to the service provider. Thus, the amount of information which needs to be passed up to the service provider is reduced, the processing load of the service provider is reduced, and processed statistics are readily available to the user.

In an embodiment of the present invention a manager of the router 3 such as a local area network manager is provided with a user interface which can comprise a web server allowing any one of the computers 1 to enter a URL to access a web page which will display the processed statistics. The processed statistics available to the user can be processed in accordance with machine independent code which conveniently comprises a Java applet. In addition to this method of interfacing using the local area network 2, the router 3 can be provided with a serial interface to allow local management e.g. the entry of configuration data or to obtain statistics.

In the router a log file is formed in memory which records each communication event and parameters of each event. These parameters can be accessed locally via the user interface and are processed to form summary information which is also available locally via the user interface. The processed statistics will periodically be transmitted to the service provider. The statistics can comprise the number of bytes transmitted and received, the number of frames transmitted and received, the number of errors, and the number of calls made. The configuration file which is remotely downloaded and includes parameters specific to the service provider, will determine how often the raw statistical data is captured, what raw statistical data should be captured, and how many samples are to be kept. The number of variables and number of samples to be kept are limited by the memory capacity of the router 3 and this will be taken into consideration by the configuration system during the formation of the configuration data since it will have all the information necessary to form the appropriate configuration data.

The statistical processing is carried out by capturing events and synchronising these events with the operation of a real time clock. This generates a table of raw statistical data. When the table of raw statistical data is full, the data is processed in accordance with the configuration data to form summary data in a summary table. It is this summary data in the summary table which can be viewed by the user interface and the type of user interface can be determined by the configuration data.

Figure 4:
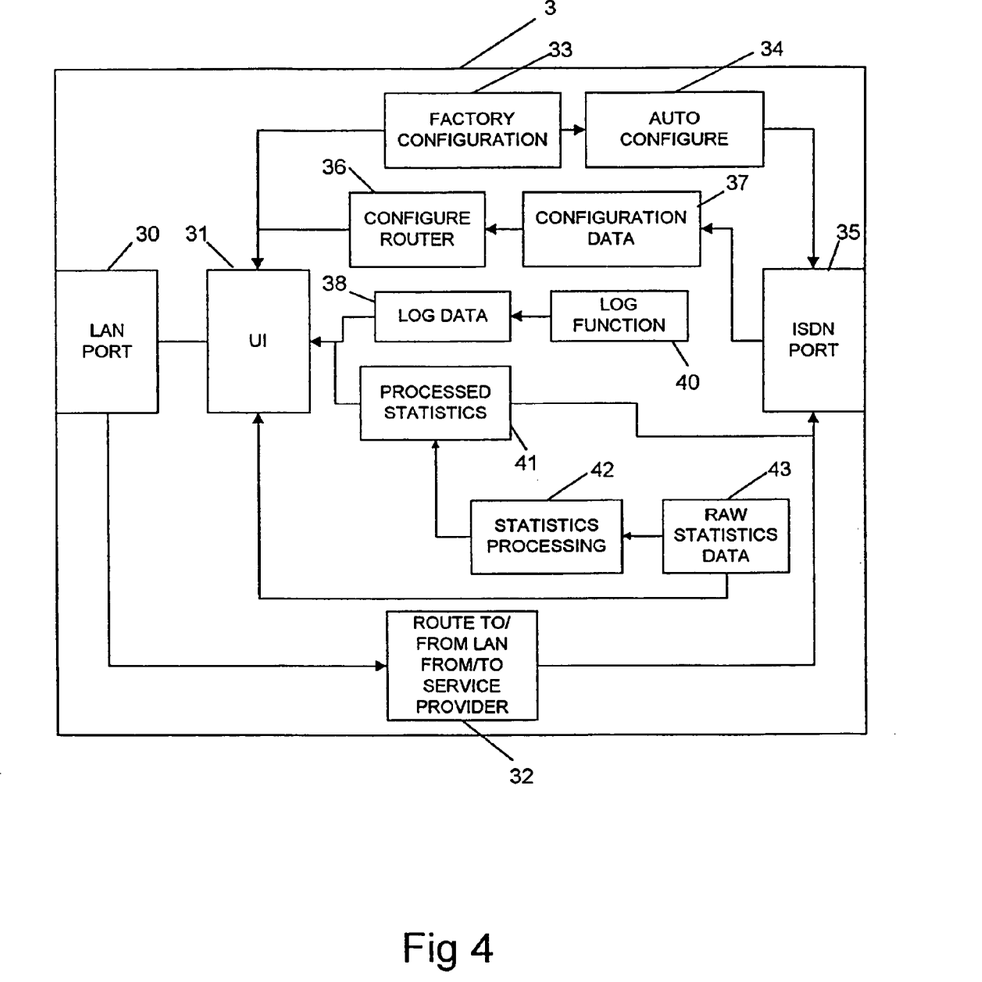
FIG. 4 is a functional diagram of the apparatus in accordance with an embodiment of the present invention.

Referring now to FIG. 4, there is illustrated a functional diagram of the router 3. A LAN port 30 interfaces the router 3 to the LAN. A route 32 is provided for communications which are to be routed to/from the LAN from/to the service provider and an ISDN port 35 is provided for interface to the telecommunications network. A factory configuration 33 is initially set within the router which initiates an auto-configuration process 34 which causes the router to dial the remote configuration system and transmit its unique serial number. Configuration data 37 is thus received a process 36 for configuring the router configures it for future communications. For all future communications a log function 40 logs communication events to form log data 38. This forms part of the raw statistical data 43 which is processed by a statistics processing procedure 42 to generate processed statistics 41. A user interface 31 provides access for a user to the raw statistical data, the log data, and the processed statistics. The type of user interface is initially dependent upon the factory configuration and subsequently to the downloaded configuration data. The processed statistics 41 is not only available to the user interface 31, it is also available via the ISDN port 35 to the service provider.

Figure 5:
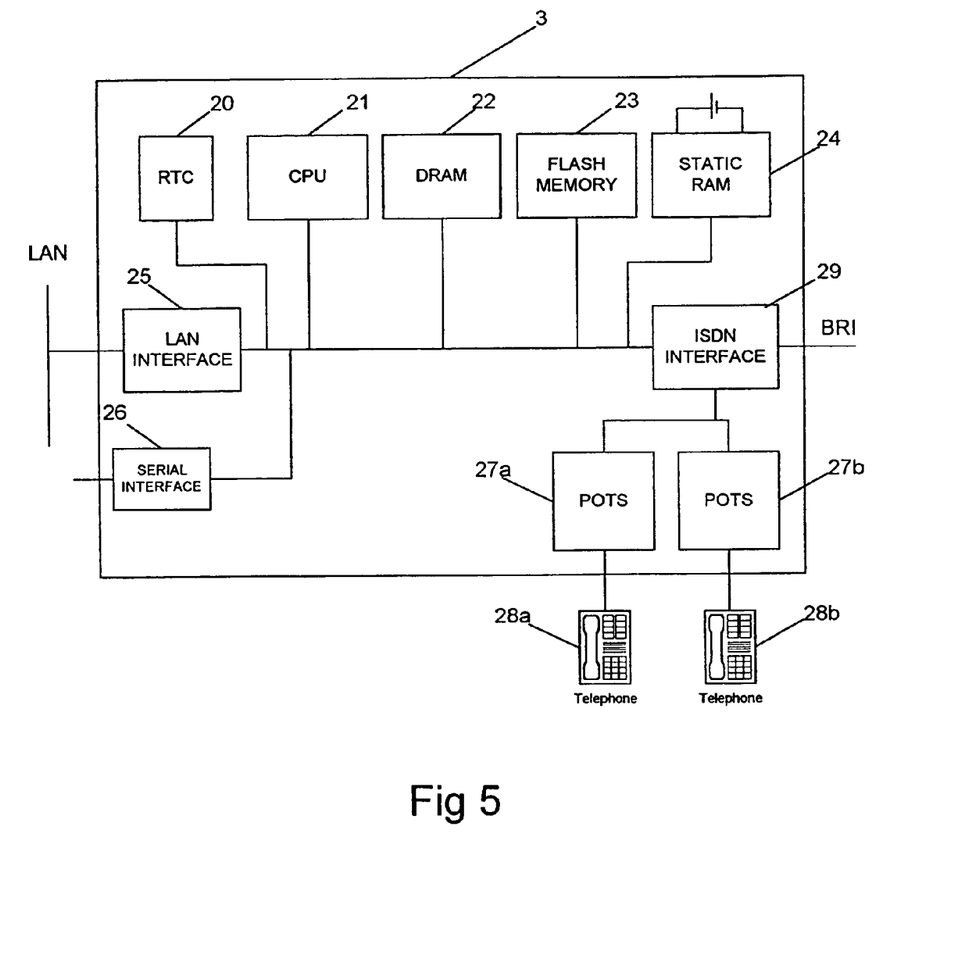
FIG. 5 is a schematic drawing of the apparatus in accordance with an embodiment of the present invention.

FIG. 5 illustrates schematically the structure of the router 3 in accordance with an embodiment of the present invention. A LAN interface is provided for connection to a LAN. The interface provides a network manager with access to the raw and processed statistical data and also allows for users to access the service provided by the service provider. A serial interface 26 is also provided for management and allows a manager to access not only the raw and processed statistical data but also the configuration data.

A real time clock 20 is provided for timing the recordal of events to form the statistical data for processing by the central processing unit 21. A dynamic random access memory 22 is also provided to act as the working memory.

Flash memory is provided for storing the programs for carrying out the configuration of the router, for carrying out the statistical processing, for routing the communications and for providing the user interface. Also the configuration data is stored in the flash memory 23. This can comprise the initial factory configuration data and one or more sets of subsequently downloaded configuration data. Also, the serial number is stored in the flash memory 23. A battery-backed static RAM 24 is also provided for storing the statistical data such as the event log and the call log. An ISDN interface 29 is provided for interfacing to a basic rate ISDN (BRI) line and two plain old telephone service (POTS) interfaces 27*a*, 27*b* provide two analogue telephone lines (one for each of the two B channels of the BRI line) for use by telephones 28*a* and 28*b*.

Although the present invention has been described hereinabove with reference to specific embodiments, the present invention is not limited to such embodiments and variations will be apparent to a skilled person in the art. For example, although the interface to a computer system has been described with reference to a LAN interface, any interface can be used e.g. a serial interface such as an RS232 interface or a USB (universal serial bus). Further, more than one interface can be provided both to the computer system and to communication lines. The communication lines can be any form of network communication lines such as a permanent leased line, an ISDN line, or a simple analogue line. Also, different services may be available for users on different communication lines provided for by different communication data for those lines.

What is claimed is:

1. A method of remotely configuring a communication apparatus for communication over a network to access at least one service system, the method comprising:

connecting said communication apparatus to said network;

automatically configuring said communication apparatus to communicate with a remote configuration system using initial configuration data stored in said communication apparatus, said initial configuration data not enabling said communication apparatus to communicate with said at least one service system, said remote configuration system and said at least one service system being arranged to allow independent communications between said communication apparatus and each of said remote configuration system and said at least one service system;

said communication apparatus automatically communicating with said remote configuration system over said network using the stored initial configuration data;

said communication apparatus transmitting unique identification information to said configuration system;

at said configuration system determining configuration data for said communication apparatus dependent upon the unique identification information and transmitting said configuration data to said communication apparatus;

storing said configuration data received from said configuration system in said communication apparatus;

controlling subsequent communications by said communication apparatus over said network to access a said service system using the stored configuration data;

transmitting subsequent configuration data to said communication apparatus automatically from said configuration system;

storing said subsequent configuration data in said communication apparatus; and controlling subsequent communications by said communication apparatus over said network to access a said service system in accordance with the stored subsequent configuration data.

2. A method according to claim 1, including the steps of a user of said communication apparatus generating a request for further subsequent configuration data, and transmitting said request to said configuration system to initiate the transmission of subsequent configuration data.

3. A method according to claim 1, wherein said configuration data is transmitted over said network using a permanently open control channel associated with a plurality of data/voice channels.

4. A method according to claim 1, including the steps at said communication apparatus, of:

gathering information on the use of said at least one service system;

processing said information to generate summary information; and periodically transmitting said summary information to a service management system.

5. A method according to claim 4, wherein said information is gathered in real time using a real time clock.

6. A method according to claim 4, including the step of supplying said information and/or said summary information to a user.

7. Communication apparatus for interfacing a computer system to a communication network to access at least one service system, the apparatus comprising:
first I/O for connection to said computer system;
second I/O for connection to the communication network;
a storage for storing unique identification information and configuration data for configuring the operation of the apparatus to access said at least one service system over said communication network;
a processor for controlling said second I/O in accordance with initial configuration data stored in said storage to connect to a remote configuration system and to transmit said unique identification information in said storage to the configuration system, said initial configuration data not enabling said processor to control said second I/O to connect to said at least one service system said processor being operable to control said second I/O to independently communicate with said remote configuration system and said at least one service system;
wherein said processor is operable to control said second I/O to receive configuration data from said configuration system, to store said received configuration data in said storage, and to control access to at least one said service system by said computer system in accordance with said received configuration data; and
wherein said processor is operable to control said second I/O to receive subsequent configuration data automatically generated by said configuration system, to store said subsequent configuration data in said storage, and to control subsequent access to at least one said service system by said computer system in accordance with said subsequent configuration data.

8. Communication apparatus according to claim 7, wherein said first I/O comprises a local area network port for connection to a local area network.

9. Communication apparatus according to claim 7, wherein said second I/O comprises an ISDN port for connection to one or more ISDN lines in said communications network.

10. Communication apparatus according to claim 9, wherein said second I/O is adapted for connection to an ISDN line having a data channel (D) and a plurality of bearer channels (B).

11. Communication apparatus according to claim 9, including at least one plain old telephone services (POTS) interface for connecting a telephone to the or each ISDN line.

12. Communication apparatus according to claim 7, including a user interface for allowing a user to generate a request for further subsequent configuration data, said processor being responsive to said request to control said second I/O to transmit said request to said configuration system to cause further subsequent configuration data to be transmitted to said apparatus.

13. Communication apparatus according to claim 7, wherein said second I/O comprises an ISDN interface for connection to one or more ISDN lines of an ISDN network having one or more channels permanently connecting said ISDN interface to the ISDN network, and for receiving said subsequent configuration data using said data channel.

14. Communication apparatus according to claim 13, wherein said ISDN interface is adapted to receive said subsequent configuration data using one or more communication channels of the or each ISDN line.

15. Communication apparatus according to claim 7, wherein said second I/O is adapted for connection to a dedicated data communication line.

16. Communication apparatus according to claim 7, wherein said processor is operable to gather information on the use of said at least one service server by said computer system, to process said information to generate summary information, and to control said second I/O to periodically transmit said summary information to a service management service.

17. Communication apparatus according to claim 16, including real time clock, wherein said processor is operable to use said real time clock to gather real time information on the use of said at least one service server by said computer system.

18. Communication apparatus according to claim 16, including user interface to allow a user of said communication apparatus access to said information.

19. Communication apparatus according to claim 18, wherein said user interface comprises a further I/O.

20. Communication apparatus according to claim 18, wherein said user interface comprises a computer program running on said processor to allow a user of said computer system access to said summary information via said first I/O.

21. Communication apparatus according to claim 20, wherein said user interface comprises said processor operating as a web server.

22. Communication apparatus according to claim 21, wherein said processor is operable to gather and process said information using machine independent instructions for output to said user.

23. Communication apparatus according to claim 7, including an encoder for encoding said unique identification information before transmission by said second I/O.

24. Communication apparatus according to claim 7, including a decoder for decoding said initial and subsequent configuration data received in encoded form by said second I/O.

25. Communication apparatus according to claim 7, wherein said second I/O includes a modem for connection to an analogue telephone line.

26. Communication apparatus for communicating with a remote system over a network to access at least one service system, the apparatus comprising:
an I/O for connection to the network;
a storage for storing unique identification information and configuration data for the operation of the communication apparatus to access said at least one service system;
a processor for controlling said I/O in accordance with initial configuration data stored in said storage to connect to a remote configuration system and to transmit said unique identification information thereto, said initial configuration data not enabling said processor to control said I/O to connect to said at least one service system, said processor being operable to control said I/O to independently communicate with said remote configuration system and said at least one service system;
wherein said processor is operable to control said I/O to receive configuration data from said configuration system, to store said received configuration data in said storage, and to control access to at least one said service system in accordance with said received configuration data; and wherein said processor is operable to control said I/O to receive subsequent configuration data automatically generated by said configuration system, to store said subsequent configuration data in said storage, and to control subsequent access to at least one said service system in accordance with said subsequent configuration data.

27. Communication apparatus according to claim 26, including an interface means for allowing a user to generate a request for further subsequent configuration data, said processor being responsive to said request to control said I/O to transmit said request to said configuration system to cause further subsequent configuration data to be transmitted to said apparatus.

28. Communication apparatus according to claim 26, wherein said I/O comprises an ISDN interface for connection to one or more ISDN lines of an ISDN network having one or more data channels permanently connecting said ISDN interface to the ISDN network, and for receiving said subsequent configuration data using said data channel.

29. Communication apparatus according to claim 28, wherein said ISDN interface is adapted to receive said subsequent configuration data using one or more communication channels of the or each ISDN line.

30. Communication apparatus according to claim 26, wherein said processor is operable to gather information on the use of said at least one service server by said computer system, to process said information to generate summary information and to control said I/O to periodically transmit said summary information to a service management system.

31. Communication apparatus according to claim 30, including real time clock, wherein said processor is operable to use said real time clock to gather real time information on the use of said at least one service system.

32. Communication apparatus according to claim 30, including user interface to allow a user of said apparatus access to said information.

33. Communication apparatus according to claim 32, wherein said user interface comprises a computer program running on said processor to allow access to said summary information.

34. Communication apparatus according to claim 33, wherein said processor is operable to gather and process said information using machine independent instructions for output to said user.

35. Communication apparatus according to claim 26, including an encoder for encoding said unique identification information before transmission by said I/O.

36. Communication apparatus according to claim 26, including a decoder for decoding configurating received in encoded form by said I/O.

37. A configuration system for connection to said communication apparatus according to claim 7 via a communication network, said configuration system comprising:

a third I/O for connection to said communication network, and for receiving said unique identification information from said communication apparatus to enable said communication apparatus to access at least one service system, said remote configuration system and said at least one service system being arranged to allow independent communications between said communication apparatus and each of said configuration system and said at least one service system; and a configuration processor responsive to said unique identification information to determine configuration data for said communication apparatus to enable said communication apparatus to access at least one said service system;

wherein said third I/O is adapted to transmit said determined configuration data to said communication apparatus near said communications network; and wherein said configuration processor is operative to automatically determine updated configuration data and to cause said third I/O to transmit said updated configuration data to said communication apparatus to enable said communication apparatus to access at least one said service system.

38. A configuration system according to claim 37, wherein said configuration processor is operative to determine said configuration data using said unique identification information, information on the user or users of said communication apparatus, and information on the service required by the user or users.

39. A configuration system according to claim 38, including obtaining means for obtaining said information on the user or users, and said information on the service required by the user or users.

40. A configuration system according to claim 39, wherein said obtaining means is adapted to obtain said information on the user or users, said information on the service required by the user or users, and expected unique identification information prior to receipt of said unique identification information by said third I/O, and said configuration processor is operative to determine said configuration data before receipt of said unique identification information using the information obtained by said obtaining means, to compare the received unique identification information with said expected unique identification, and to cause said third I/O to transmit the configuration data if there is a match in the comparison.

41. A configuration system according to claim 40, including means for storing a plurality of sets of said configuration data for a corresponding plurality of said expected unique identification information for a corresponding plurality of said communication apparatuses, wherein said configuration system can connect to a plurality of said communication apparatuses.

42. A configuration system according to claim 37, wherein said configuration processor is responsive to a request for configuration data received by said third I/O from said communication apparatus to determine configuration data and control said third I/O to transmit said determined configuration data.

43. A configuration system according to claim 37, including a decoder for decoding encoded unique identification information received from said apparatus.

44. A configuration system according to claim 41, including an encoder for encoding said configuration data for transmission to said apparatus.

* * * * *